Sept. 28, 1948.   L. L. WEISGLASS   2,450,319
PHOTOELECTRIC EXPOSURE METER FOR ENLARGERS USING
DIFFERENTIAL MEANS TO INDICATE CONTRAST
Filed April 23, 1946   5 Sheets-Sheet 1

Louis L. Weisglass
INVENTOR.

BY Walter E. Wallheim

ATTORNEY.

Fig: 2

Louis L. Weisglass
INVENTOR.

BY Walter E. Wallheim
ATTORNEY.

Sept. 28, 1948.                L. L. WEISGLASS                 2,450,319
         PHOTOELECTRIC EXPOSURE METER FOR ENLARGERS USING
                DIFFERENTIAL MEANS TO INDICATE CONTRAST
Filed April 23, 1946                                    5 Sheets-Sheet 3

Fig: 4

Louis L. Weisglass
    INVENTOR.

BY Walter E. Wollheim

ATTORNEY.

Louis L. Weisglass
INVENTOR.

BY *Walter E. Wollheim*

ATTORNEY.

Patented Sept. 28, 1948

2,450,319

UNITED STATES PATENT OFFICE 2,450,319

PHOTOELECTRIC EXPOSURE METER FOR ENLARGERS USING DIFFERENTIAL MEANS TO INDICATE CONTRAST

Louis L. Weisglass, New York, N. Y., assignor to Simmon Brothers, Inc., Long Island City, N. Y., a corporation of New York Application April 23, 1946, Serial No. 664,149

5 Claims. (Cl. 88—23)

1

The object of this invention is an instrument which indicates the correct exposure time for and the contrast of the enlarged image of a photographic negative projected by a photographic enlarger upon an easel. This is accomplished by a photoelectric cell adapted to be placed upon the easel and associated with a suitable electric circuit including means to measure the magnitude of the electric current passing the cell in response to the illumination falling thereupon. In this manner it becomes possible to measure the light intensity of selected points on the easel or, more specifically, the light intensity of the brightest and of the darkest point, respectively. Mechanical means are provided to translate these measurements into indications for exposure time and contrast. It is necessary to indicate contrast, in addition to exposure time, since otherwise the contrast range of the photographic negative and of the sensitized paper on which the enlarged image is being printed cannot be matched, and the indication of the contrast is, therefore, instrumental in enabling the operator to select a paper with the proper degree of contrast for this particular print.

A preferred embodiment of the invention is shown in the accompanying drawings, in which Fig. 1 shows the appearance of a preferred form of an instrument embodying the principles of the invention in connection with a typical enlarger;

Fig. 3 shows schematically the resistance element used in this potentiometer;

Fig. 4 shows an axonometric view of the gear mechanism associated with this potentiometer, in the interest of simplicity gears being represented as simple circles or cylinders, the individual teeth not being shown;

Fig. 5 is a top view of the photoelectric cell and its housing with the cover removed;

Fig. 6 is a cross-sectional view along the plane of line 6—6 in Fig. 5;

Fig. 8 shows a motor driven rotating switch which forms part of this circuit.

Like characters of reference denote similar parts throughout the several views and the following specification.

General principle

In its preferred embodiment this invention

2 comprises a photoelectric cell mounted in a suitable housing which can be placed on the easel so that individual image elements thereupon can be analyzed. This photoelectric cell is associated with an electric circuit which enables the operator to measure the magnitude of the current passing the cell. For this purpose, two part circuits are provided, the output voltage of the first part circuit being directly controlled by said photoelectric cell, and the output voltage of the second circuit being controlled by a manually operated rheostat. A separate balance indicator shows when the difference between the two output voltages assumes a predetermined value. The rheostat is equipped with two independent sliding contacts which may be selectively connected into the circuit. One of these contacts is set while the photoelectric cell is placed on the point of brightest illumination on the easel, and the other one is set while the cell is placed on the darkest part of the easel. Each of these contacts is mechanically connected to a movable member, and the indicator for the exposure time is associated with the member which follows the contact adapted to be set for the point of brightest illumination. A differential mechanism, preferably a differential gear, is provided which is being acted upon by the aforementioned two members, and which, in turn, actuates a third member which moves in accordance with the difference of the settings of the first two members, and the contrast indicating means are engaged by said third member.

As can be seen in Fig. 1, the unit is physically divided into two parts, i. e., the cell housing and the main cabinet, which are connected by a suitable multiple conductor cable. The front face of the main cabinet carries two coaxial handwheels 96 and 100 which actuate the two rotating contacts of the aforementioned rheostat. It also carries two scales indicating exposure time and contrast values, respectively, and two pointers acting on these scales. There is also a simple switch which throws one or the other of the rheostat contacts into the circuit and which has two positions marked "dark" and "bright," respectively. A small glow lamp 111 is also mounted on this panel, this glow lamp serving as a balance indicator for the two circuits mentioned above. The various circuit elements such as transformers, rectifying tubes, capacitors and others are all contained in this cabinet, but since their position within this cabinet is of no particular consequence, the interior of this cabinet has not been shown in detail, and I have merely shown a circuit diagram, Fig. 8, and a cross-sectional view through the rheostat and the associated gear system, Fig. 2, since these two elements form the most important components of this invention.

Photoelectric cell

Basically the photoelectric cell may be of any of the several types well known in the art, but in practice, I prefer to use a so-called electron multiplier tube since in this manner no separate and complex amplifier will be necessary. An electron multiplier tube comprises an evacuated glass vessel with a plurality of electrodes. The first of these electrodes has a coating of a suitable metal, usually potassium or caesium and has, in a manner well known in the art, the property to emit electrons upon exposure to light. A supply circuit which will be explained in detail later on imposes a suitable voltage between two subsequent electrodes, each electrode being positive with respect to the preceding one. The relatively few electrons emitted by the first photoemissive electrode are thereby attracted by the second electrode and, striking this second electrode, release a certain number of secondary electrons. This number of secondary electrons is larger than the number of the primary electrons causing their release, and the property of the tube to "multiply" electrons is based on this fact. These secondary electrons are made to impinge upon the third electrode releasing there a still larger number of "tertiary" electrons, and this process is repeated at each subsequent stage until a very high amplification factor is obtained in this manner. Referring to the circuit diagram, Fig. 8, the glass vessel of the multiplier tube is designated 20. The first photoemissive electrode is designated 21 and subsequent electrodes are designated 22 to 30.

Supply circuit for multiplier tube

The voltage required between two subsequent electrodes is of the general order of 100 volts and, since a typical tube has ten electrodes, a voltage of approximately 1000 volts together with a suitable voltage divider with ten steps would be necessary. Since a device of this character is expensive and has also several other disadvantages, I make use of a supply circuit which has already been fully disclosed in my copending application #585,350. This supply circuit uses a battery of condensers or capacitors 31 to 39 inclusive. The intermediate points of this battery are connected as shown to subsequent electrodes of the multiplier tube. These intermediate points are also connected to switch buttons 40 to 49 which are mounted in a circle on a plate made from Bakelite or some other suitable insulating material. This arrangement can be seen in Fig. 8. This assembly of switch buttons is mounted opposite to two rotating contacts 50 and 51 which are mounted on a shaft 52 made again from insulated material. Also mounted on this shaft are two slip rings 53 and 54 which are connected to the two rotating contacts 51 and 50, respectively. These slip rings, in turn, are in current conducting relationship with two brushes 55 and 56, and the entire assembly comprising the shaft 52, the slip rings 53 and 54, and the contacts 51 and 50, is kept rotating by means of two gears 57 and 58 and a small motor 59. The two brushes 55 and 56 are, in turn, connected to a suitable source of direct current. This source must supply a direct current of a voltage substantially equal to the voltage required between subsequent electrodes of the multiplier tube, but may otherwise be of any convenient design; for example, it may be a battery. As a preferred example, I show a transformer with a primary coil 60, and iron core 61 and a secondary coil 62. The secondary coil 62 delivers a certain A. C. voltage which passes the rectifying tube 63 and charges the condenser 64. Since it is desirable to have the output voltage of this condenser rendered constant and independent of accidental line voltage fluctuations, I provide a gas filled regulator tube 65 in series with a resistor 66. Parallel to the regulator tube 65 is a potentiometer 67 including a sliding contact 68 by means of which the voltage impressed upon the brushes 53 and 54 can be adjusted.

By means of this potentiometer the total voltage impressed upon the multiplier tube can be adjusted. Only a relatively small adjustment is necessary since the sensitivity of multiplying tubes follows approximately the seventh power of the impressed voltage. This adjustment can very conveniently be utilized to adjust the sensitivity of the photoelectric circuit in accordance with the sensitivity of the sensitized paper which happens to be used. For a more complete description of this method to energize vacuum tubes of the multiplier type, I wish to refer to my beforementioned copending application #585,350.

Measuring circuit

It is necessary to provide means to indicate the magnitude of the electric current passing the photoelectric tube in response to the received illumination. These indicating means may comprise, for example, a sensitive microammeter but, in practice, I prefer to use the following system: Two part circuits are provided, the output voltage of the first part circuit being controlled by the photoelectric cell, and the output circuit of the second circuit being manually controlled by suitable means such as, for example, a rheostat. The output voltages of both circuits are made to oppose each other, and indicating means are provided to indicate when the difference between the two output voltages assumes a predetermined value.

Photoelectric part circuit

Most of the salient parts of this part circuit have already been described and it is merely necessary to mention at this point that the output of the multiplier tube is impressed on a resistance 70. The voltage between points 71 and 72 is in direct proportion to the illumination which impinges upon the electrode 21 of the multiplier tube.

Manually controlled part circuit

Figure 7:
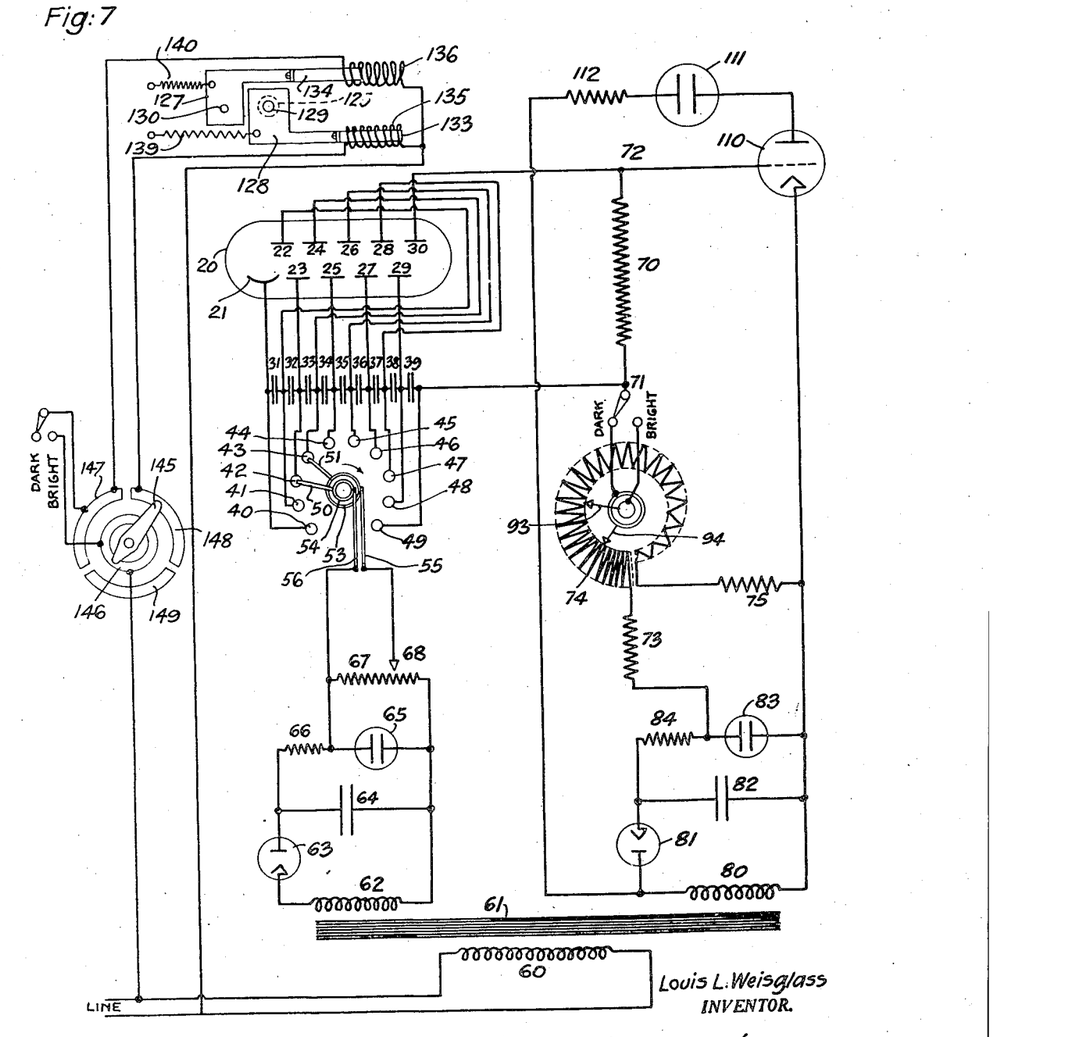
Fig. 7 is the electrical circuit.

This part circuit is shown on the right side of Fig. 7. It consists of a source of D. C. which is impressed upon the three resistors 73, 74 and 75 which are connected in series. Resistors 73 and 75 are fixed, but resistor 74 forms part of a potentiometer which will be described in detail below. The source of direct current which passes these three resistors may again be a battery or any other suitable source and again merely as a preferred means I use a transformer, a rectifying tube and a condenser. The transformer may be a separate transformer or, more conveniently, a secondary coil 80 may be wound on the same iron core 61 which is already being used for the transformer of the photoelectric part circuit. The alternating current delivered by this secondary is passing a rectifying tube 81 and charging a condenser 82. The terminals of this condenser are connected to a second gas filled regulator tube 83 which is in series with a fixed resistance 84. The three aforementioned resistors 73, 74 and 75 constitute the load circuit, and are connected in parallel to the regulator tube 83. The voltage impressed upon these three resistors is thereby rendered constant and independent of accidental line voltage fluctuations.

I have not shown any current supply for the filaments of the two rectifying tubes 63 and 81 as well as for the thyratron 110 to be mentioned later. Means to supply these filaments with current are well known in the art and, for example, separate transformers may be used, or additional turns of wire may be wound on the iron core 61 of the transformer that supplies the plate current for the two circuits.

Rheostat

Figure 2:
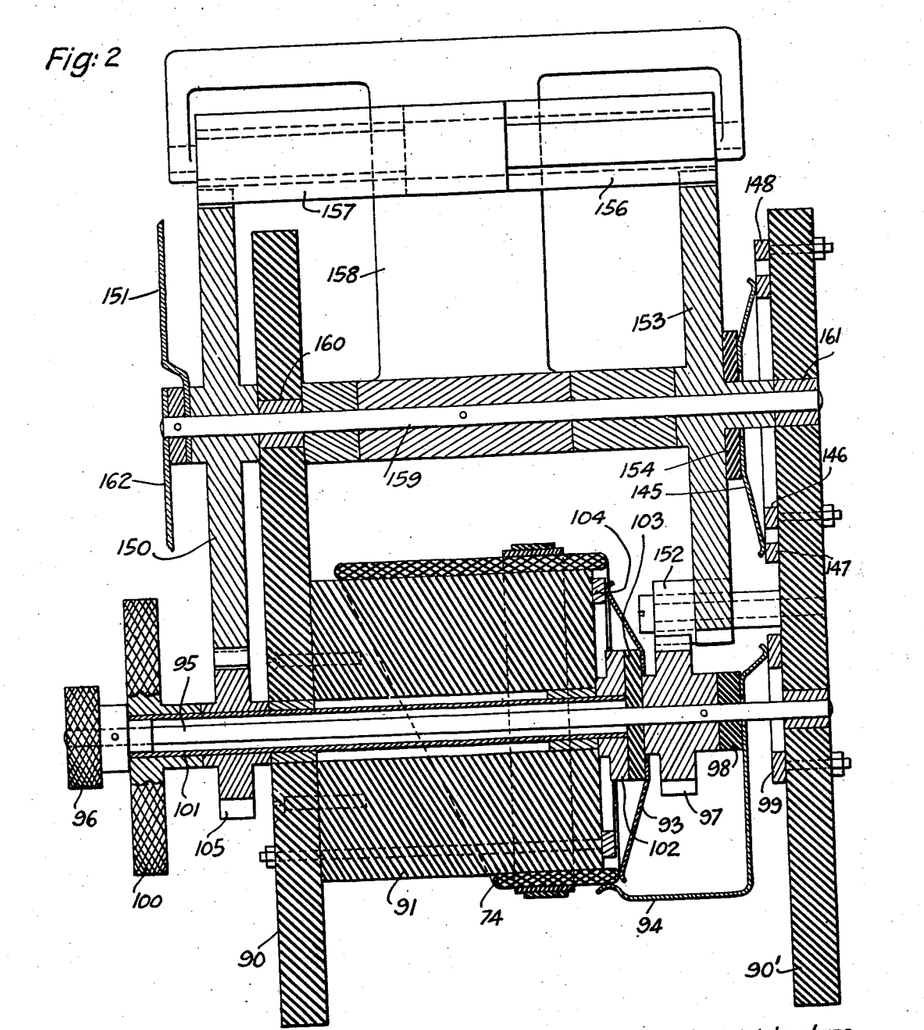
Fig. 2 is a cross-sectional view along the plane of line 2—2 in Fig. 1 showing drawn in a larger scale the principal part of this device comprising a potentiometer with two independent contacts and connected to a gear mechanism.

The manually adjustable rheostat which controls the last named circuit is one of the most essential parts of this instrument and will, therefore, be described in detail. A cross-sectional view is shown in Fig. 2.

The rheostat, together with the associated gear mechanism which will be described later, is mounted on a structure which comprises two parallel plates 90 and 90' made from a suitable insulating material. A cylindrical body 91 made from a similar material is attached to plate 90. The two plates 90 and 90' are fastened to each other by simple studs which, however, have not been shown in the drawings. The cylindrical body 91 serves as a support for a resistance element 74. This resistance element comprises a relatively large number of convolutions of thin resistance wire wound on a flexible strip made from sheet fibre or other insulating material. This insulating strip is held flat while the wire is being wound thereupon, but is afterwards bent into a cylindrical shape and attached to the cylindrical support 91. It is desirable to shape this resistance element so that the rheostat has a logarithmic attenuation. For this reason, the supporting strip is given a trapezoidal shape as shown in Fig. 3. This shape, of course, will cause the rheostat to have a lower resistance value per unit length at one end than at the other. This, by itself, will not as yet give a true logarithmic attenuation and the wire is, therefore, wound on this trapezoidal element with a variable pitch, the convolutions being relatively close together on the high side of the supporting strip and relatively far part on the low side. By varying the pitch of the wire in a suitable manner, a very satisfactory approximation of a logarithmic attenuation can be obtained.

Two sliding contacts 93 and 94 slide on this resistance element 74. These contacts are insulated from each other and are fastened to two rotatable coaxial shafts. The inner shaft 95 is actuated by the smaller or the two coaxial handwheels 96 and carries a gear 97, the purpose of which will be explained later. Fastened to this gear is a disc 98, made from insulated material, and contact 94 in the shape of an elastic spring made from Phosphor bronze or beryllium copper or the like is fastened to disc 98. One end of this spring makes contact with the aforementioned resistance 74 and the other end is in contact with a ring made from brass or the like 99. This ring serves as a connecting element to the other parts of the circuit. Spring 94 has such a shape that it does not touch the shaft 95.

The larger of the two handwheels 100 is fastended to a hollow shaft 101 made from a steel tubing or the like. Fastened to this hollow shaft is a flange 102 which, in turn, carries a disc made from insulating material 103. This disc supports the second contact 93 which also is made from Phosphor bronze or beryllium copper. One end of this contact 93 slides on the resistance element 74 and the other end slides on a metal ring made from brass or the like 104 which is mounted on the aforementioned cylindrical body 91 made from insulating material. By means of ring 104 the rotating spring 93 is connected to the other circuit elements. A gear 105 is also fastened to the hollow shaft 101.

Balance indicator

The purpose of the balance indicator is to indicate when the difference between the two output voltages of the photoelectric part circuit and of the manually controlled part circuit, respectively, assumes a predetermined value. This can, for example, be done by a sensitive galvanometer. In this case it would be most logical to adjust the two voltages until they are equal to each other or until their difference becomes zero. As a preferred device I use a gas filled thyratron tube 110 in series with a load device which indicates when said thyratron becomes current conducting. This load device may be of any suitable type and again a galvanometer may very well be used. As a preferred device I use a small glow lamp 111 filled with neon or other suitable gas. A current limiting resistor 112 is connected in series with this lamp. As can be seen in Fig. 7 the grid of the thyratron is connected to point 72, and the grid voltage of the thyratron with respect to its filament depends, therefore, upon the voltage which is impressed upon resistor 75, that portion of the resistor 74 up to the point where it makes contact with one of the sliding contacts which is in the circuit, contact 94 in this case and resistance 70. The voltage across resistance 75 and part of resistance 74 represents the output voltage of the manually controlled part circuit. The voltage impressed upon resistance 70 represents the output voltage of the photoelectric part circuit. By tracing the circuit of Fig. 7 it will be noted that both voltages are of opposite polarity, i. e., oppose each other and, therefore, the voltage between the filament and grid of the thyratron represents the difference between the output voltages of the manually controlled and of the photoelectrically controlled part circuit, respectively. A thyratron usually becomes current conducting as soon as the voltage of the grid with respect to the filament becomes higher than approximately $-2$ volts and this is the voltage which, in the appended claims has been called "the predetermined value of the difference between the two output voltages of the two part circuits." In other words, if the grid is more negative than $-2$ volts with respect to the filament, no current will flow and the glow lamp 111 will remain dark. As soon as the negative bias of the grid with respect to the filament is less than $-2$ volts, current will begin to flow and the glow lamp 111 will light up. There is usually a small borderline region when the glow lamp will flicker at more or less frequent intervals and the critical setting of the potentiometer is made relatively easy thereby. The plate circuit of the thyratron may be connected to any convenient source of alternating current and merely as a convenience I am using the voltage delivered by the secondary coil 80 of the transformer described above. As can be seen, one end of the coil 80 is connected to the filament of the thyratron; the anode of the thyratron is connected to one side of the glow lamp 111; the other side of the glow lamp is connected to the current limiting resistance 112 which, in turn, is connected to the other side of the secondary coil 80.

*Means to extend the range of the measuring circuit*

The rotation of one of the sliding contacts 93 or 94 for one whole revolution will accommodate variations in the measured intensity of the light impinging upon the photoelectric cell approximately in the range of 1:10. This is usually enough for measuring the intensity of the brightest spot on the easel, particularly in view of the fact that the operator may control the light intensity with fairly wide limits by using the iris diaphragm of the enlarging lens or, possibly, by other means. Therefore, contact 93 has been limited to perform one revolution upon resistance element 74.

A similar limitation, however, cannot be imposed upon the other sliding contact 94 that indicates by its position the light intensity on the darkest point of the easel, because this intensity is affected not only by the intensity impinging upon the brightest spot, but also by the contrast range of the photographic negative. Contrast ranges of the order of 1:100 are not infrequent and, therefore, if one allows a variation of 1:10 for the brightest spot, the illumination of the darkest spot may vary as much as 1:1000. In order to accommodate this exceedingly wide range, I make use of an expedient which has already been disclosed in my copending application #633,475, now Patent 2,411,486, issued November 19, 1946.

This method consists essentially of permitting the sliding contact 94 to make several revolutions, usually 3, and changing the light admittance of the photoelectric cell after each revolution. The light admittance of the photoelectric cell is most conveniently changed by interposing suitable diaphragms with smaller or larger apertures. If one revolution of the rheostat contact 94 accommodates a range of light intensity in the proportion of 1:10 and if one provides three diaphragms with apertures varying in the proportion of 1:10:100, light intensities in the proportion of 1:1000 can be accommodated. The arrangement is shown schematically in Fig. 7 and also in Figs. 5 and 6.

Referring to Figs. 5 and 6, the photoelectric cell 20 is mounted in the conventional tube socket 120 which, in turn, is attached to a plate 121. This plate is mounted in a housing 122, the upper part of which is closed by a cover 123. Cover 123 has been omitted in Fig. 5. Plate 121 supports directly above the photoelectric cell a thin plate 124 with a relatively large aperture 125. Between this aperture and the photoelectric cell there is a small disc of diffusing glass 126. It is the purpose of this diffusing glass to prevent irregularities due to the fact that without it the light impinging upon the light sensitive electrode 21 may hit more or less sensitive spots thereon. By interposing this diffusing glass the entire area of this light sensitive electrode will be evenly illuminated.

Mounted on top of plate 121 are two electromagnetically controlled diaphragms 127 and 128. Diaphragm 128 has a medium sized aperture 129 which is smaller than the aforementioned large aperture 125. In the numerical example in which one revolution of the rheostat accommodates a light range 1:10, the area of aperture 129 would be 1/10 of the area of aperture 125. The diaphragm 127 has an aperture 130 which is still smaller and which, in the same example would have 1/10 of the area of aperture 129 or 1/100 of the area of aperture 125. Each of these diaphragms has the shape shown in Fig. 5, and the two diaphragms are arranged in slightly different planes as can be seen in Fig. 6. Each of these diaphragms has an upturned lug 131 and 132, respectively, and to each of these upturned lugs there is attached an iron core 133 and 134. Two electromagnetic coils 135 and 136 are provided which, when energized, attract one of these iron cores, respectively. As shown in the drawings, coil 135 is represented as being energized and has thereby attracted iron core 133 which, in turn, places diaphragm 128 in a position in which its aperture 129 is directly above the photosensitive electrode 21 of the photoelectric cell. Each of these aperture plates has a slot 137 and 138, respectively, and each of these slots engages two guide pins which can be seen in Fig. 5. Return springs 139 and 140 are provided which return the diaphragm blades to their original positions as soon as the corresponding coil is de-energized.

Which of these coils, if any, is energized depends upon the position of a rotating switch which is shown on the left side of Fig. 7. It comprises a rotating spring 145 made from Phosphor bronze or beryllium copper or the like which makes contact with a circular ring 146 at one end and with a similar ring at the other end. The second mentioned ring, however, is split into three segmental parts 147, 148 and 149. Ring segment 147 is connected to coil 136 and ring segment 148 is connected to coil 135. The circular ring 146 is connected to one end of the line, and the two other ends of both coils 135 and 136 are connected to the other end of the line. A simple switch is provided by means of which parts 146 and 147 can be shortened. This switch is mechanically connected to a similar switch shown further to the right, above the cylindrical potentiometer of the manually controlled circuit, by means of which one or the other of the two sliding contacts 93 or 94 can be thrown into the circuit. The result of this arrangement is that when both switches are in the position for the brightest spot, not shown, the smallest aperture 130 is automatically placed in front of the photoelectric cell.

The rotating spring contact 145 is rotated by a large gear 153 which is, in turn, actuated by the aforementioned gear 97 of Fig. 2 through an intermediate gear 152. The gear 97 is mechanically connected to the rotating contact 94 of the logarithmic potentiometer, and the ratio between the two gears 97 and 153 is 1:3. This arrangement accomplishes that, after each full revolution of spring 94, contact 145 moves from one segment to the next one, thereby changing the electrical connections of the diaphragm blades and the electromagnetic coils. In other words, the operator, for example, performs first one full revolution with both coils de-energized, i. e., spring 145 in contact with the non-connected segment 149. In this position both diaphragm blades are moved by their respective return springs to the left, Fig. 5, and the light admittance of the cell is controlled by the size of the diaphragm opening 125. After a full revolution of spring 94, contact 145 has made one third of a revolution and will come in contact with segment 148 thereby energizing coil 135. This, in turn, attracts the right diaphragm 128 which is now shifted to the right so that its medium sized aperture 129 is above the photoelectric cell thereby limiting its light admittance. This is the position shown in Figs. 2 and 7. After another full revolution of contact 94 the rotating contact 145 has moved another third of a revolution and will move from contact with segment 148 into contact with segment 147, thereby de-energizing coil 135 and energizing coil 136. Coil 135 will now release blade 128 which will return towards the left to its original position and coil 136 will attract blade 137 which will now move to the right, placing the smallest diaphragm opening 130 above the photoelectric cell. The general principle of this arrangement has been fully disclosed in my copending application #633,475 and I wish to refer to this application for a fuller description of the principles involved and the specific means employed to this end.

Gear systems

The positions of the two sliding contacts 93 and 94 are, as has been explained, indicative of the light intensity of the brightest and of the darkest point on the easel, respectively. These light intensity values are translated into indications for exposure time and for the contrast value by means of a gear system which can be seen in Fig. 2 as well as in axonometric projection in Fig. 4.

Sliding contact 93 rotates with the hollow shaft 101. Fastened to the same hollow shaft is a small gear 105 which is in mesh with a large gear 150. This large gear carries a pointer 151 which indicates exposure times on a scale visible in Fig. 1. Since the resistance element of the rheostat has a logarithmic attenuation, as explained above, the spacing of the lines on this dial will be unequal, being relatively wide apart at the low values and relatively close together at the high values. In other words, this scale resembles a scale of a slide rule.

In this manner exposure times are set in accordance with the light intensity of the brightest spot on the easel. Experience has shown that this is the most practical way to coordinate light values and exposure times, and it means really that the exposure time is so adjusted that well exposed shadows are being obtained.

The sliding contact 94 rotates a shaft 95 and the small gear 97 is also attached to this shaft. This gear is in mesh with another small gear 152 which, in turn, is in mesh with a large gear 153. Gear 153 is in a different plane from gear 97, but has the same diameter and number of teeth as gear 150. However, due to the interposed reversing gear 152 the two large gears 150 and 153 will rotate in opposite directions, when the two gears 105 and 97 associated with the two sliding contacts 93 and 94 rotate in the same direction. Gear 153 carries an insulating disc 154 which, in turn, carries the leaf spring 145 of the rotating switch which actuates the two electromagnets of the diaphragm control of the photoelectric cell unit which has been described above.

In order to indicate the contrast of the image projected on the easel I provide an element which moves in accordance with the difference between the rotary travels of gears 153 and 150. This mechanism is preferably formed by a differential gear arrangement. While this differential gear system may be of any of the well known designs, the one I have shown in Figs. 2 and 4 is preferred on account of its simplicity. It comprises two pinions or spur gears with relatively wide teeth 156 and 157. They are arranged in such a way that gear 156 is in mesh with gear 153 and that gear 157 is in mesh with gear 150, and that the two pinions 156 and 157 are in mesh with each other. This can be clearly seen in the axonometric projection of Fig. 4. The two pinions 156 and 157 are mounted on a bracket 158 and this bracket is fastened to a rotatable shaft 159. This shaft is supported in two bearings 160 and 161 which are attached to the plates 90 and 90' which support the entire rheostat and gear mechanism. The function of this differential arrangement is quite simple. The angular travel of bracket 158 is equal to half the sum of the angular travels of the two large gears 150 and 153. The angular travel of gear 150 is in direct proportion to the light intensity falling upon the brightest spot of the easel, being connected to contact 93, whereas the angular travel of gear 153 is, due to the interposed reversing gear 152, negatively in proportion to the light intensity falling upon the darkest part of the easel, being connected to contact 94. Therefore, the arm 158 supporting the two pinions 156 and 157 will perform a rotary travel in proportion to the difference between the two light intensities. The shaft 159 serves also as a support for the large gears 150 and 153 which may freely rotate thereon. The front end of shaft 159 carries a pointer 162 which rotates with it and with the bracket 158 which supports the two pinions 156 and 157. This pointer 162 indicates on a scale the contrast value of the image projected on the easel, and this scale can be seen in Fig. 1. Contrast is usually expressed by the difference between the logarithmic values of the light intensity of the brightest and of the darkest point and, therefore, since the rheostat has a logarithmic attenuation, the divisions of this scale are evenly spaced or, in other words, there is a linear scale for the contrast values.

The contrast scale may be modified for the convenience of the operator and may, for example, have marks directly indicating the contrast values of various grades of papers which the operator may choose to use. There is also a paper with variable contrast commercially available, known by the trade name "Varigam," which permits very "contrasty" prints by the use of blue light and very "soft" prints by the use of yellow light, any intermediate contrast being obtainable by a double exposure with blue and yellow light, respectively, in the proper proportions. If it is desirable to use variable contrast paper of this type in connection with the object of this invention, it will, of course, be possible to substitute directly a percentage scale of blue or yellow light, respectively, for the contrast scale shown in Fig. 1. Since the contrast of this paper changes substantially in linear proportion to the color mixture, this scale will also have at least substantially even spacing.

While I have shown and described a preferred embodiment of the invention, it is obvious that many changes of form, proportions and minor details of construction may be resorted to without departing from the principles or sacrificing any of the advantages of the invention as defined in the appended claims.

What I claim as new is:

1. An exposure and contrast meter for photographic enlargers of the type which projects an enlarged image of a photographic negative on an easel comprising a photoelectric cell adapted to be placed on said easel for measuring the light intensity of the brightest and darkest point thereon, an electric circuit operatively connected to said photocell and comprising two part circuits, the first part circuit having an output voltage controlled by said photocell and including, in series with said cell, a resistor upon which said output voltage is impressed, the second part circuit having a rheostat controlling the output voltage of said second part circuit, said rheostat comprising a resistance element and two independently movable contacts in current conducting relationship therewith, these contacts being insulated from each other, and a switch connected to said contacts whereby one of said contacts may be selected to carry said output voltage, depending upon whether said cell has been placed upon the brightest or upon the darkest point on the easel, means to make said two output voltages oppose each each other, means to indicate when the difference of said two output voltages, resulting from the adjustment of said rheostat, assumes a predetermined value, a mechanism comprising three movable members, the first two members controlled by the operator, operatively connected to said two movable contacts, respectively, and adapted to indicate, by the positions assumed by them when the difference of said two output voltages has been adjusted to said predetermined value, the light intensities of the brightest and darkest point on the easel, respectively, the third member in operative engagement with said first two members and adapted to be moved by their coaction in accordance with the ratio of said two light intensities, a first scale element calibrated in exposure time values and a first mark element, one of said elements connected to said first member and the other element being stationary, both coacting to indicate the correct exposure time of said image on said easel, and a second scale element calibrated in contrast values, and a second mark element, one of these last named elements connected to said third member and the other element being stationary, both coacting to indicate the contrast value of said image on said easel.

2. An exposure and contrast meter for photographic enlargers of the type which projects an enlarged image of a photographic negative on an easel comprising a photoelectric cell adapted to be placed on said easel for measuring the light intensity of the brightest and darkest point thereon, an electric circuit operatively connected to said photocell and comprising two part circuits, the first part circuit having an output voltage controlled by said photocell and including, in series with said cell, a resistor upon which said output voltage is impressed, the second part circuit having a rheostat controlling the output voltage of said second part circuit, said rheostat comprising a resistance element and two independently movable contacts in current conducting relationship therewith, these contacts being insulated from each other, and a switch connected to said contacts whereby one of said contacts may be selected to carry said output voltage, depending upon whether said cell has been placed upon the brightest or upon the darkest point on the easel, means to make said two output voltages oppose each other, means to indicate when the difference of said two output voltages, resulting from the adjustment of said rheostat, assumes a predetermined value, a mechanism comprising three movable members, the first two members controlled by the operator, operatively connected to said two movable contacts, respectively, and adapted to indicate, by the positions assumed by them when the difference of said two output voltages has been adjusted to said predetermined value, the logarithmic values of the light intensities of the brightest and darkest point on the easel, respectively, the third member in operative engagement with said first two members and adapted to be moved by their coaction in accordance with the difference of said two logarithmic values of said light intensities, a first scale element calibrated in exposure time values and a first mark element, one of said elements connected to said first member and the other element being stationary, both coacting to indicate the correct exposure time of said image on said easel, and a second scale element calibrated in contrast values, and a second mark element, one of these last named elements connected to said third member and the other element being stationary, both coacting to indicate the contrast value of said image on said easel.

3. An exposure and contrast meter according to claim 1, said first part circuit having manually operated means to control the input voltage, whereby the light sensitivity of said circuit may be adjusted in accordance with the light sensitivity of the sensitized paper on which an enlarged print is being made.

4. An exposure and contrast meter according to claim 1, the operative connections between said first two members and said movable rheostat contacts being formed by a train of gears connecting said first member to one of said contacts, and another train of gears connecting said second member to the other of said contacts, one of said trains of gears having one more gear than the other train, whereby the direction in which one of said members moves is being reversed, so that the first and the second member move in opposite directions when said two contacts move in the same direction.

5. An exposure and contrast meter according to claim 1, said three members being mounted on three independently rotatable coaxial shafts, means causing said first two members to rotate in opposite directions upon an increase in illumination of the brightest and of the darkest part of the image on the easel, respectively, and differential gear means actuated by said first two members and causing said third member to travel in accordance with the difference between the two respective rotary travels of said first members.

LOUIS L. WEISGLASS.

REFERENCES CITED

The following references are of record in the file of this patent:

UNITED STATES PATENTS

| Number | Name | Date |
| --- | --- | --- |
| 2,164,513 | Gaebel | July 4, 1939 |
| 2,209,156 | Fischer | July 23, 1940 |
| 2,293,425 | Dammond | Aug. 18, 1942 |